(12) United States Patent
Van Gorp et al.

(10) Patent No.: US 9,965,841 B2
(45) Date of Patent: May 8, 2018

(54) MONITORING SYSTEM BASED ON IMAGE ANALYSIS OF PHOTOS

(71) Applicant: SCHNEIDER ELECTRIC USA, INC., Andover, MA (US)

(72) Inventors: John C. Van Gorp, Sidney (CA); Jacques Roland van Campen, Saanichton (CA)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days. days.

(21) Appl. No.: 15/055,764

(22) Filed: Feb. 29, 2016

(65) Prior Publication Data
US 2017/0249731 A1    Aug. 31, 2017

(51) Int. Cl.
*G06K 9/00* (2006.01)
*G06T 7/00* (2017.01)
(Continued)

(52) U.S. Cl.
CPC ........ *G06T 7/0004* (2013.01); *G05B 19/4183* (2013.01); *G06K 9/6284* (2013.01);
(Continued)

(58) Field of Classification Search
CPC ........ G06T 7/0004; G06T 2207/10004; G05B 19/4183; Y02P 90/10; G06K 9/6284; G06K 2209/03
(Continued)

(56) References Cited

U.S. PATENT DOCUMENTS

| 5,225,997 A | 7/1993 | Lederer et al. |
| 5,382,943 A | 1/1995 | Tanaka |

(Continued)

FOREIGN PATENT DOCUMENTS

| DE | 102006051014 A1 | 4/2008 |
| EP | 2535781 A1 | 12/2012 |

(Continued)

OTHER PUBLICATIONS

Deffeyes, S. et al., "Augmented reality in the data center", 2010, ATN, vol. 1, No. 2.
(Continued)

*Primary Examiner* — Aaron W Carter
(74) *Attorney, Agent, or Firm* — Lando & Anastasi, LLP (57) ABSTRACT

A method of monitoring equipment data of a piece of equipment includes extracting data specifications from a first image, the first image including data specification information for the piece of equipment, and storing the data specifications. The method further includes extracting measurement data from at least one second image, the at least one second image including measurement information for the piece of equipment. The method further includes associating the measurement data with the piece of equipment and storing the measurement data. The method further includes generating a measurement data trend profile for the piece of equipment and comparing operational measurement data against the measurement data trend profile. The method further includes notifying one or more users when the operational measurement data associated with the piece of equipment deviates from the measurement data trend profile.

18 Claims, 7 Drawing Sheets

(51) Int. Cl.
  *G05B 19/418* (2006.01)
  *G06K 9/62* (2006.01)
(52) U.S. Cl.
  CPC .............. *G06K 2209/03* (2013.01); *G06T 2207/10004* (2013.01); *Y02P 90/10* (2015.11)
(58) Field of Classification Search
  USPC ............... 382/141, 154, 199, 294; 33/12; 112/475.09; 250/341.8; 348/86; 356/601, 611; 700/100, 104, 132; 706/13
  See application file for complete search history.

(56) References Cited

U.S. PATENT DOCUMENTS

| | | | |
|---|---|---|---|
| 5,388,032 | A | 2/1995 | Gill et al. |
| 5,400,246 | A | 3/1995 | Wilson et al. |
| 5,870,698 | A | 2/1999 | Riedel et al. |
| 6,088,816 | A | 7/2000 | Nouri et al. |
| 6,100,806 | A | 8/2000 | Gaukel |
| 6,281,790 | B1 | 8/2001 | Kimmel et al. |
| 6,396,534 | B1 | 5/2002 | Mahler et al. |
| 6,437,691 | B1 | 8/2002 | Sandelman et al. |
| 6,553,336 | B1 | 4/2003 | Johnson et al. |
| 6,611,866 | B1 | 8/2003 | Goldman |
| 6,714,977 | B1 | 3/2004 | Fowler et al. |
| 6,925,350 | B2* | 8/2005 | Watanabe .............. A41H 3/007 33/12 |
| 7,024,474 | B2 | 4/2006 | Clubb et al. |
| 7,058,471 | B2* | 6/2006 | Watanabe .............. A41H 3/007 112/475.09 |
| 7,372,451 | B2 | 5/2008 | Dempski |
| 7,450,248 | B2* | 11/2008 | Fujieda .................. G01B 11/24 356/601 |
| 7,456,736 | B2 | 11/2008 | Primm et al. |
| 7,506,264 | B2 | 3/2009 | Polan |
| 7,519,909 | B2 | 4/2009 | Kuiawa et al. |
| 7,561,717 | B2 | 7/2009 | Anderson |
| 7,587,080 | B1* | 9/2009 | Good ................... G06T 7/0004 348/86 |
| 8,351,680 | B2 | 1/2013 | Kalteis |
| 8,369,217 | B2* | 2/2013 | Bostica ................. H04W 24/00 370/229 |
| 8,577,120 | B1* | 11/2013 | Koshti .................. G06T 7/0004 250/341.8 |
| 2001/0047410 | A1 | 11/2001 | Defosse |
| 2002/0043969 | A1 | 4/2002 | Duncan et al. |
| 2002/0071031 | A1 | 6/2002 | Lord et al. |
| 2002/0161885 | A1 | 10/2002 | Childers et al. |
| 2003/0011647 | A1 | 1/2003 | Abbondanzio et al. |
| 2003/0033550 | A1 | 2/2003 | Kuiawa et al. |
| 2003/0090503 | A1 | 5/2003 | Leapman |
| 2004/0160897 | A1 | 8/2004 | Fowler et al. |
| 2004/0163102 | A1 | 8/2004 | Fowler et al. |
| 2005/0071093 | A1 | 3/2005 | Stefan |
| 2005/0071444 | A1 | 3/2005 | Motoyama |
| 2005/0242189 | A1 | 11/2005 | Rohs |
| 2005/0246436 | A1 | 11/2005 | Day et al. |
| 2006/0028488 | A1 | 2/2006 | Gabay et al. |
| 2006/0038833 | A1 | 2/2006 | Mallinson et al. |
| 2006/0238339 | A1 | 10/2006 | Primm et al. |
| 2007/0030824 | A1 | 2/2007 | Ribaudo et al. |
| 2007/0088823 | A1 | 4/2007 | Fowler et al. |
| 2007/0287473 | A1 | 12/2007 | Dupray |
| 2008/0215727 | A1 | 9/2008 | Denis et al. |
| 2008/0263150 | A1 | 10/2008 | Childers et al. |
| 2008/0317021 | A1 | 12/2008 | Ives et al. |
| 2009/0113323 | A1 | 4/2009 | Zhao et al. |
| 2009/0121860 | A1 | 5/2009 | Kimmel et al. |
| 2009/0322884 | A1* | 12/2009 | Bolick ................... G01D 4/008 348/160 |
| 2011/0037712 | A1 | 2/2011 | Kim et al. |
| 2011/0138416 | A1 | 6/2011 | Kang et al. |
| 2011/0138444 | A1 | 6/2011 | Kang et al. |
| 2011/0191454 | A1 | 8/2011 | Joukov |
| 2011/0218730 | A1 | 9/2011 | Rider et al. |
| 2011/0241833 | A1 | 10/2011 | Martin et al. |
| 2012/0026530 | A1 | 2/2012 | Tsongas et al. |
| 2012/0075343 | A1 | 3/2012 | Chen et al. |
| 2012/0236161 | A1 | 9/2012 | Kwon et al. |
| 2012/0249588 | A1 | 10/2012 | Tison et al. |
| 2012/0313963 | A1 | 12/2012 | Chen-Quee et al. |
| 2013/0024785 | A1 | 1/2013 | Van Wie |
| 2013/0026220 | A1* | 1/2013 | Whelihan .......... G06F 17/30879 235/375 |
| 2013/0031202 | A1 | 1/2013 | Mick et al. |
| 2013/0038633 | A1 | 2/2013 | Maggiore |
| 2013/0069985 | A1 | 3/2013 | Wang et al. |
| 2013/0169681 | A1 | 7/2013 | Rasane et al. |
| 2014/0028712 | A1 | 1/2014 | Keating et al. |
| 2014/0147021 | A1 | 5/2014 | Wang et al. |
| 2014/0203071 | A1 | 7/2014 | Eggert |
| 2014/0270477 | A1 | 9/2014 | Coon |
| 2015/0043887 | A1 | 2/2015 | Gurudoss et al. |
| 2015/0187137 | A1 | 7/2015 | Mullins |
| 2015/0213325 | A1 | 7/2015 | Krishnamoorthi et al. |
| 2015/0302650 | A1 | 10/2015 | Abdelmoati et al. |
| 2015/0325047 | A1 | 11/2015 | Conner et al. |
| 2016/0162772 | A1* | 6/2016 | Curtis .................. G02B 27/017 345/8 |
| 2016/0203445 | A1* | 7/2016 | Honsinger ............. G06Q 10/20 705/7.15 |
| 2016/0327293 | A1 | 11/2016 | Grabowski et al. |
| 2017/0116493 | A1* | 4/2017 | Harmon ................... G06K 9/18 |
| 2017/0160733 | A1* | 6/2017 | Oostendorp ......... G08B 21/182 |
| 2017/0168656 | A1* | 6/2017 | Teachman ............. G06F 3/0481 |

FOREIGN PATENT DOCUMENTS

| | | |
|---|---|---|
| JP | 2013161395 A | 8/2013 |
| WO | 2007066166 A1 | 6/2007 |
| WO | 2013136295 A1 | 9/2013 |
| WO | 2015047411 A1 | 4/2015 |

OTHER PUBLICATIONS

Kahn et al.: "Beyond 3D as-Built Information using Mobile AR enhancing the Building Lifecycle Management", CyberWorlds (CW), 2012 International Conference on, IEEE, Sep. 25, 2012, pp. 29-36.

Valentin et al.: "Smarter Objects: Using AR technology to Program Physical Objects and their Interactions", CHI Changing Perspectives, Apr. 27, 2013, pp. 961-966.

Webel: "Multimodal Training of Maintenance and Assembly Skills Based on Augmented Reality", Dec. 7, 2011, retrieved from the Internet: <http://tuprints.ulb.tu-darmstadt.de/2858/1/SW_Diss_final.pdf> [retrieved on Jan. 12, 2016], p. 68; figure 5.11.

Extended European Search Report from corresponding EP Application No. 17154206.1 dated Jun. 29, 2017.

* cited by examiner

MONITORING SYSTEM BASED ON IMAGE ANALYSIS OF PHOTOS

BACKGROUND OF THE DISCLOSURE

1. Field of the Disclosure

This disclosure relates generally to devices used to monitor equipment, and more particularly to systems and related methods for extracting and analyzing trend data from the monitored equipment.

2. Discussion of Related Art

The value of monitoring equipment in support of energy management is becoming widely accepted, but even basic energy monitoring systems must be procured and installed before this value can be realized. Conventional monitoring devices generally must be installed and connected to one or more communication systems, and the installation and connection of digital and analog I/O to the equipment is necessary to track the operation of the equipment. The installation of such monitoring devices can be expensive and complex, and usually requires training users to operate the new, unfamiliar monitoring devices.

SUMMARY OF THE DISCLOSURE

One aspect of the present disclosure is directed to a method of monitoring equipment data of a piece of equipment, the method comprising extracting data specifications from a first image, the first image including data specification information for the piece of equipment, storing the data specifications, extracting measurement data from at least one second image, the at least one second image including measurement information for the piece of equipment, associating the measurement data with the piece of equipment, storing the measurement data, generating a measurement data trend profile for the piece of equipment, comparing operational measurement data against the measurement data trend profile, and notifying one or more users when the operational measurement data associated with the piece of equipment deviates from the measurement data trend profile.

Embodiments of the method further may include assigning a tag to the piece of equipment. The tag may be assigned to the measurement data. The operational measurement data may be automatically associated with the tag. The first image may be an image of a nameplate, and the at least one second image may be an alphanumeric measurement display. In some embodiments, the at least one second image may be a fiduciary marker. The measurement data trend profile may include one or more sets of operational measurement data. The one or more sets of operational measurement data may be extracted from one or more images including measurement information for the piece of equipment. The method may further include notifying the one or more users when the operational measurement data associated with the piece of equipment deviates from the data specifications.

Another aspect of the present disclosure is directed to a system for monitoring equipment data of a piece of equipment, the system comprising a piece of equipment, a specification data display affixed to the piece of equipment, a measurement data display coupled to the piece of equipment, and a controller coupled to a memory, the controller being configured to receive a first image, the first image including the specification data display, extract data specifications from the first image, store the data specifications in the memory, receive at least one second image, the at least one second image including the measurement data display, extract measurement data from the at least one second image, associate the measurement data with the piece of equipment, store the measurement data in the memory, generate a measurement data trend profile for the piece of equipment, compare operational measurement data against the measurement data trend profile, and notify one or more users when the operational measurement data associated with the piece of equipment deviates from the measurement data trend profile.

Embodiments of the system may further include the controller being configured to assign a tag to the piece of equipment. The controller may be configured to assign the tag to the measurement data, and may further be configured to automatically associate the operational measurement data with the tag. The at least one second image may include a unique identifier. The measurement data display may include alphanumeric measurement information in some embodiments. In other embodiments, the measurement data display can include a fiduciary marker. The measurement data trend profile may include one or more sets of operational measurement data, wherein the one or more sets of operational measurement data may be extracted from one or more images including measurement information for the piece of equipment. The controller may be configured to notify the one or more users when the operational measurement data associated with the piece of equipment deviates from the data specifications.

These and other features and advantages of the present disclosure will now be described in greater detail with reference to the accompanying drawings, detailed description and claims.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure or characteristic described may be included in at least one embodiment. The appearances of such terms herein are not necessarily all referring to the same embodiment.

DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION OF THE DISCLOSURE

This disclosure is not limited in its application to the details of construction and the arrangements of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

This present disclosure is directed to a method of monitoring a piece of equipment for anomalous behavior. A controller is configured to receive images including at least specification information and measurement data from an image capture device. Measurement data extracted from each image is assigned a tag (e.g., "HVAC 5," "Server #3," etc.) associated with the piece of equipment. A data trend profile is created (or updated if the data trend profile already exists for the associated piece of equipment) to track measurement data samples over time. Most measurement data (e.g., power, voltage, current) associated with a piece of equipment can be expected to stay substantially constant over an extended period of time. By tracking measurement data in a data trend profile over time, a change in normal measurement data can be easily identified and relayed to a user or set of users to take further action.

Figure 1:
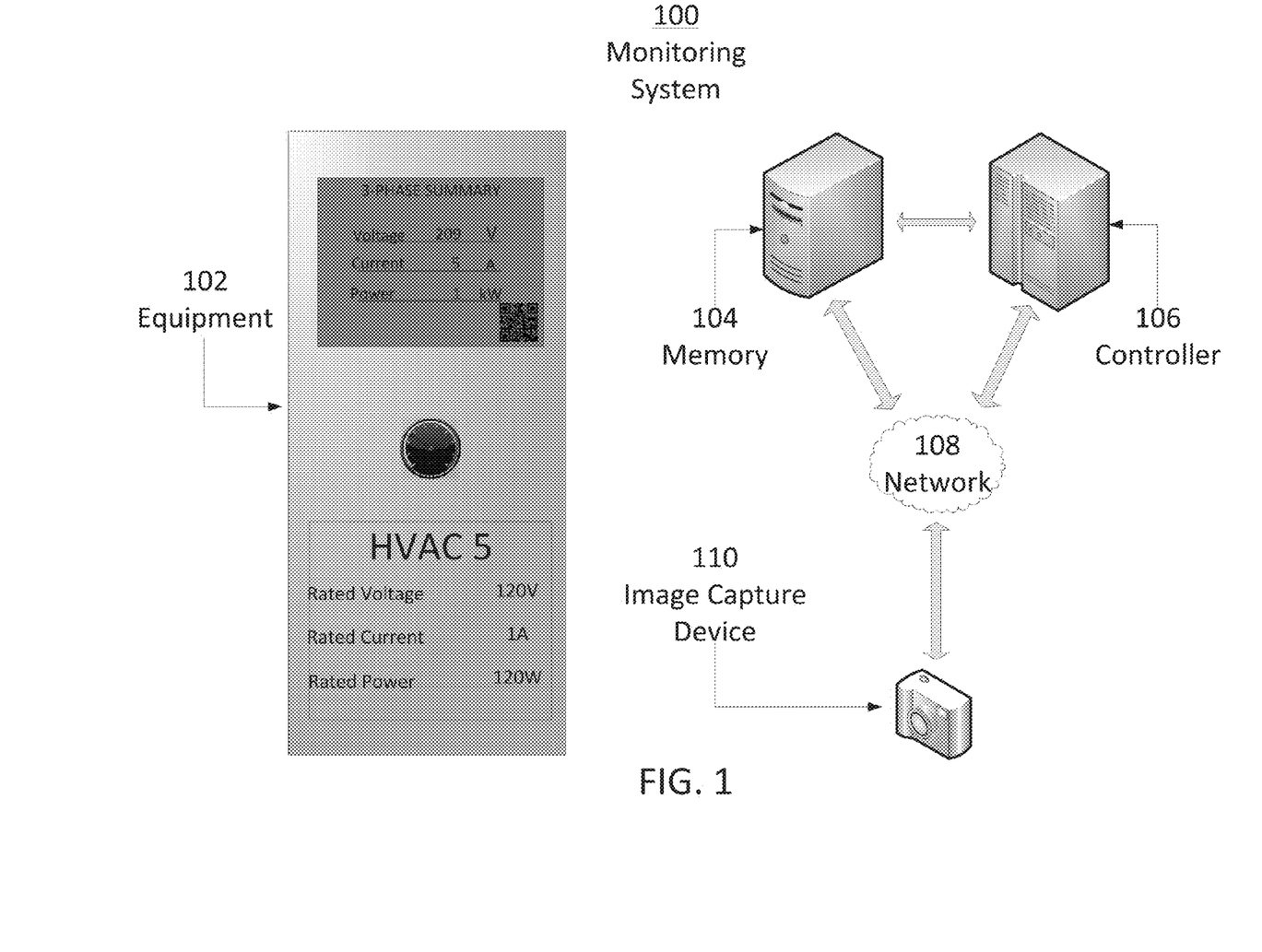
FIG. 1 is a diagram of a monitoring system in accordance with an embodiment of the present disclosure.

Referring to FIG. 1, a diagram of a monitoring system 100 is shown. The monitoring system 100 includes a piece of equipment 102, a memory 104, a controller 106 and an image capture device 110. As shown, the memory 104 and the controller 106 are communicatively coupled to each other, and each is communicatively coupled to the image capture device 110 through a communication network 108.

The piece of equipment 102 can be any equipment that includes parameters capable of being monitored (e.g., current, voltage, power), such as HVAC units, servers, mainframes, and other similar devices. The image capture device 110 (e.g., a camera) is operable to capture one or more image(s) of displays indicating measurements of the parameters, and to submit the image(s) to the controller 106 for analysis. The image capture device 110 can be operated by a user in some examples, while in others, the image capture device 110 operates automatically.

Figure 2:
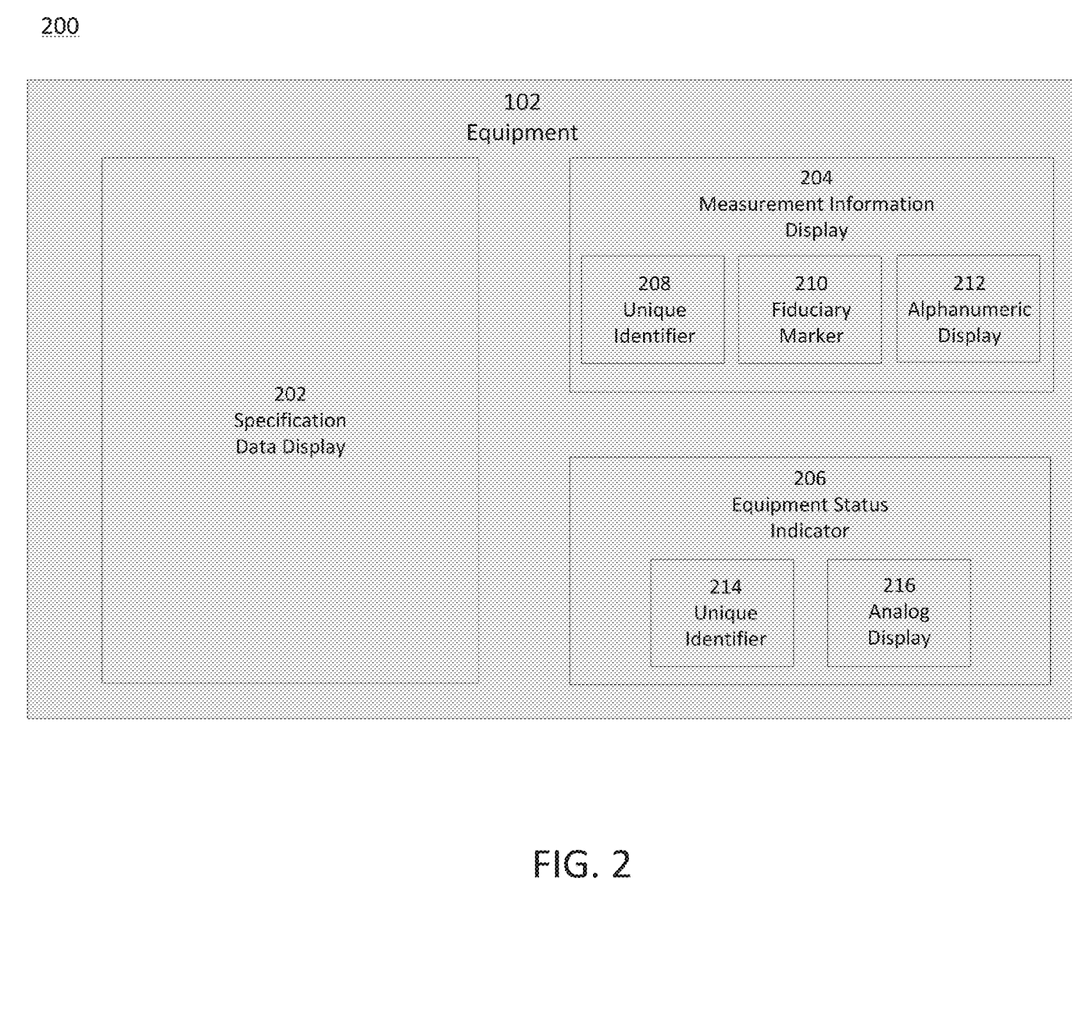
FIG. 2 is a block diagram of one example of a piece of equipment that may be monitored.

Referring to FIG. 2, a block diagram 200 of the piece of equipment 102 is shown. As discussed above, the piece of equipment 102 can be, for example, an HVAC unit or a server. The piece of equipment 102 includes a specification data display 202, a measurement information display 204 and an equipment status indicator 206. The specification data display 202 displays specification information indicating normal rated operating conditions (e.g., a rated voltage of 120V and a rated current of 1 A) for the piece of equipment 102. The specification data display 202 can be a physical nameplate affixed to the equipment 102 in some examples, while in others, the specification data display 202 can be a digital display coupled to the piece of equipment 102. Additional, alternate display media are available in yet other examples.

The measurement information display 204 is operable to display measurement information measured from the piece of equipment 102, including, for example, the current power consumption level and the current voltage level. The measurement information display 204 includes a unique identifier 208, a fiduciary marker 210, and an alphanumeric display 212. In some examples, the measurement information display 204 includes the fiduciary marker 210 and the alphanumeric display 212, while in other examples, the measurement information display 204 includes the fiduciary marker 210 and/or the alphanumeric display 212, but not both. In yet other examples, the measurement information display 204 includes neither the fiduciary marker 210 nor the alphanumeric display 212, and instead employs some other means of displaying measurement information.

The unique identifier 208 can be any distinguishing feature that uniquely identifies the measurement information display 204. For example, the unique identifier 208 may be a physical label (e.g., that reads "HVAC 5," "Server #3," etc.) that the controller 106 can recognize in an image taken by the image capture device 110. In some embodiments, the controller 106 can learn that the unique identifier 208 is associated with a specific piece of equipment 102 and automatically associate any subsequent images involving the unique identifier 208 with this specific piece of equipment 102, permitting the creation of a centralized database of information and data sorted by each piece of equipment.

The fiduciary marker 210 can be any information-encoding marker (e.g., a 2D barcode, a Quick Response (QR) code, etc.). Images taken of the measurement information display 204 including the fiduciary marker 210 by the image capture device 110 can be analyzed by the controller 106 to decode measurement information from the fiduciary marker 210. For example, the measurement information can include voltage conditions, current conditions, power conditions, for the piece of equipment 102 at a given point in time (e.g., the time at which the image capture device 110 took an image of the fiduciary marker 210) that the controller 106 can extract from the fiduciary marker 210.

The alphanumeric display 212 can be displayed by the measurement information display 204 in lieu of, or in addition to, the fiduciary marker 210, and is operable to display measurement information in an alphanumeric format. For example, the measurement information displayed can include voltage conditions, current conditions, power conditions and so forth, displayed in an alphanumeric format rather than being encoded by a fiduciary marker (e.g., fiduciary marker 210) as discussed above. Images taken of the measurement information display 204 including the alphanumeric display 212 by the image capture device 110 can be analyzed by the controller 106 to identify and extract the measurement information discussed above.

As discussed, the piece of equipment 102 further includes an equipment status indicator 206 having a unique identifier 214 and an analog display 216. The unique identifier 214 can be any unique distinguishing feature that can identify the equipment status indicator 206, such as a unique physical label, similar to the unique identifier 208 discussed above.

The analog display 216 can be any analog gauge or meter used to display equipment status (e.g., temperature, air flow, etc.). For example, the analog display 216 can be an analog needle gauge or a digital gauge. In some embodiments, the controller 106 may prompt a user to calibrate a first image of the analog display 216 captured by the image capture device 110. For example, the controller 106 may be operable to identify that the analog display 216 is an analog needle gauge as discussed above, but may need calibration as to a range of values displayed by the analog display 216. In other examples, the controller 106 can compare an image of the analog display 216 against a database of analog displays, and can provide suggestions to a user regarding the type of analog display 216 identified in the image. The user can select a matching analog display from the suggestions, and the controller 106 will calibrate the analog display 216 to the user selection.

Figure 3:
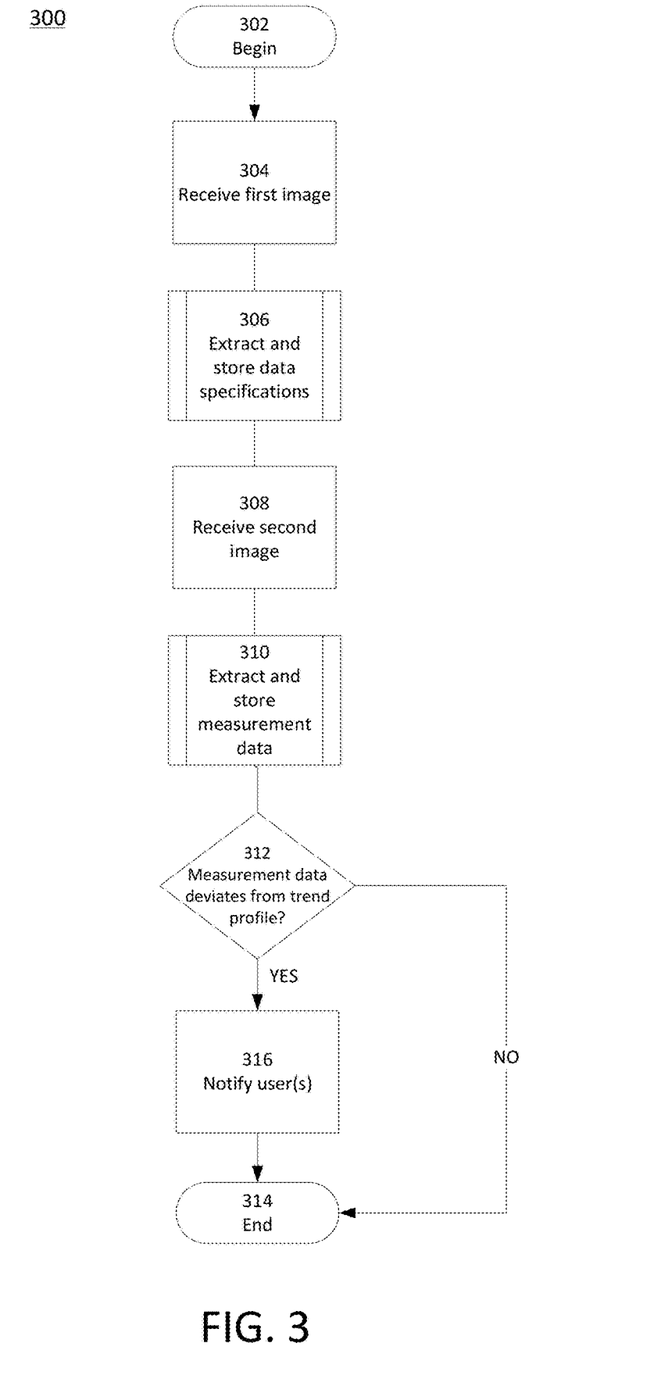
FIG. 3 is a process flow chart used to determine if the piece of equipment being monitored exhibits anomalous behavior.

FIG. 3 illustrates a process 300 executed by a controller for determining if a piece of equipment is exhibiting anomalous behavior. Generally speaking, the process 300 involves the receipt of images containing equipment information (e.g., equipment status readings or equipment data), and extracting, storing and analyzing this information from the images. At step 302, the process begins.

At step 304, the controller 106 receives a first image from the image capture device 110. The first image can, for example, be an image of the specification data display 202 coupled to the piece of equipment 102. At step 306, the controller 106 extracts data specification information from the first image and stores the information in the memory 104, as explained in more detail with respect to FIG. 4 below.

The process 300 continues to step 308, in which the controller 106 receives a second image. The second image may, for example, be an image of the measurement information display 204 or the equipment status indicator 206. At step 310, the controller 106 extracts measurement data from the second image and stores the data in the memory 104, as explained in more detail with respect to FIG. 5 below.

At step 312, the controller 106 evaluates whether the measurement data extracted from the second image deviates from a trend profile associated with the piece of equipment 102 to which the measurement data pertains, as explained in more detail below with respect to FIG. 6. The trend profile can contain one or more measurements taken over a period of time and can indicate general trend information for the measurement parameter. For example, the data trend profile may include voltage measurements taken for a piece of equipment roughly every month over the course of a year. If the measurement data sample (e.g., a voltage measurement) does not deviate from the trend profile (312 NO), the process 300 ends at step 314. However, if the measurement data does deviate from the trend profile (312 YES), the process 300 continues to step 316. At step 316, one or more users are notified that the measurement data sample has deviated from the trend profile, after which the one or more users may take appropriate action. For example, rising power consumption measurements may prompt the one or more users to contact an energy management institution for a consultation regarding a reduction in energy costs. As mentioned above, the process 300 ends at step 314.

As discussed above, FIG. 4 illustrates a process 400 executed by a controller for extracting and storing data specifications from an image as performed in step 306 of the process 300. The image can be of a nameplate affixed to a piece of equipment, for example, and the nameplate can contain specification information relating to the piece of equipment. At step 402, the process begins.

Figure 4:
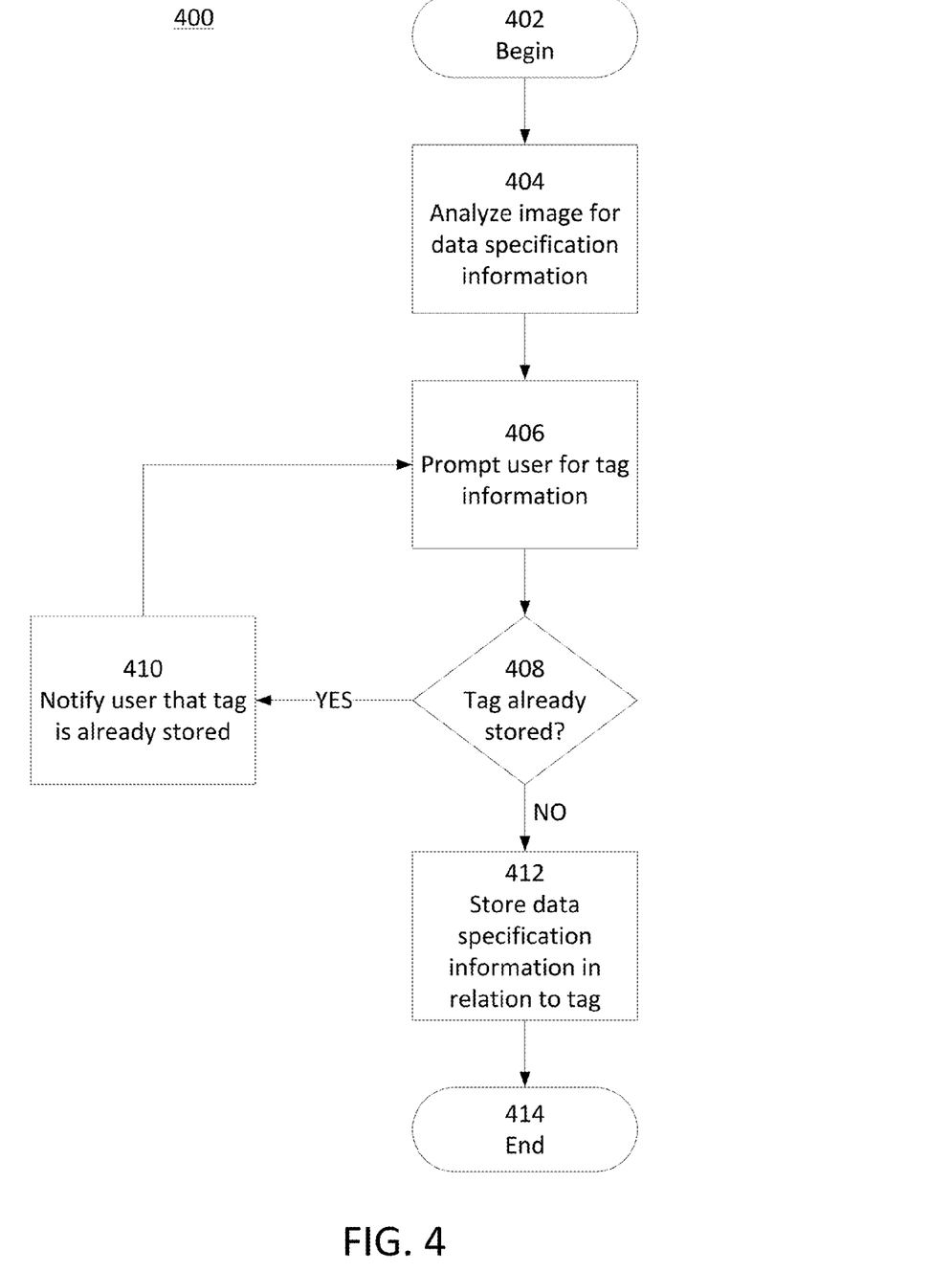
FIG. 4 is a process flow chart used to determine data specification information from an image.

At step 404, the controller 106 analyzes the first image for data specification information. For example, the controller 106 can analyze the first image for key words (e.g., "rated voltage," "rated current," etc.) and values associated with the keywords, and automatically extract specification information without intervention by a user. In some examples, however, user input may be required for the controller 106 to complete the analysis of the first image, as discussed in more detail below.

The process 400 continues to step 406, in which the controller 106 prompts a user to assign a tag to the piece of equipment. For example, the tag can include a descriptor indicative of the piece of equipment with which the specification information is related (e.g., "HVAC 5," "Server #3," etc.), and can be used to consistently group any subsequent information pertaining to the piece of equipment 102 under a unified tag in the memory 104. For example, responsive to receiving a search request of "HVAC 5," the controller 106 is operable to search the memory 104 for any information with an "HVAC 5" tag.

At step 408, the controller 106 receives a tag from the user and evaluates whether or not the chosen tag is already in use. If the tag is already taken (408 YES), the process 400 continues to step 410, in which the user is notified that the tag is already in use. The process then returns to step 406, in which the controller 106 prompts the user for a new tag. If the tag is not already taken (408 NO), the process 400 continues to step 412. At step 412, the data specification information retrieved from analyzing the image at step 404 is stored in the memory 104 in relation to the tag chosen at step 406. At step 414, the process 400 ends.

As discussed above, FIG. 5 illustrates a process 500 executed by a controller 106 for extracting and storing measurement data from an image as performed in step 310 of the process 300. At step 502, the process begins. At step 504, an image is analyzed to extract measurement information or equipment status information. As discussed above with respect to FIG. 2, the measurement information may be displayed through any one or more of a variety of media, including, for example, alphanumeric displays, 2D barcodes and QR codes, which can be captured in an image by the image capture device. The equipment status information can be displayed by an analog gauge, such as analog gauge 216, also as discussed above with respect to FIG. 2.

Figure 5:
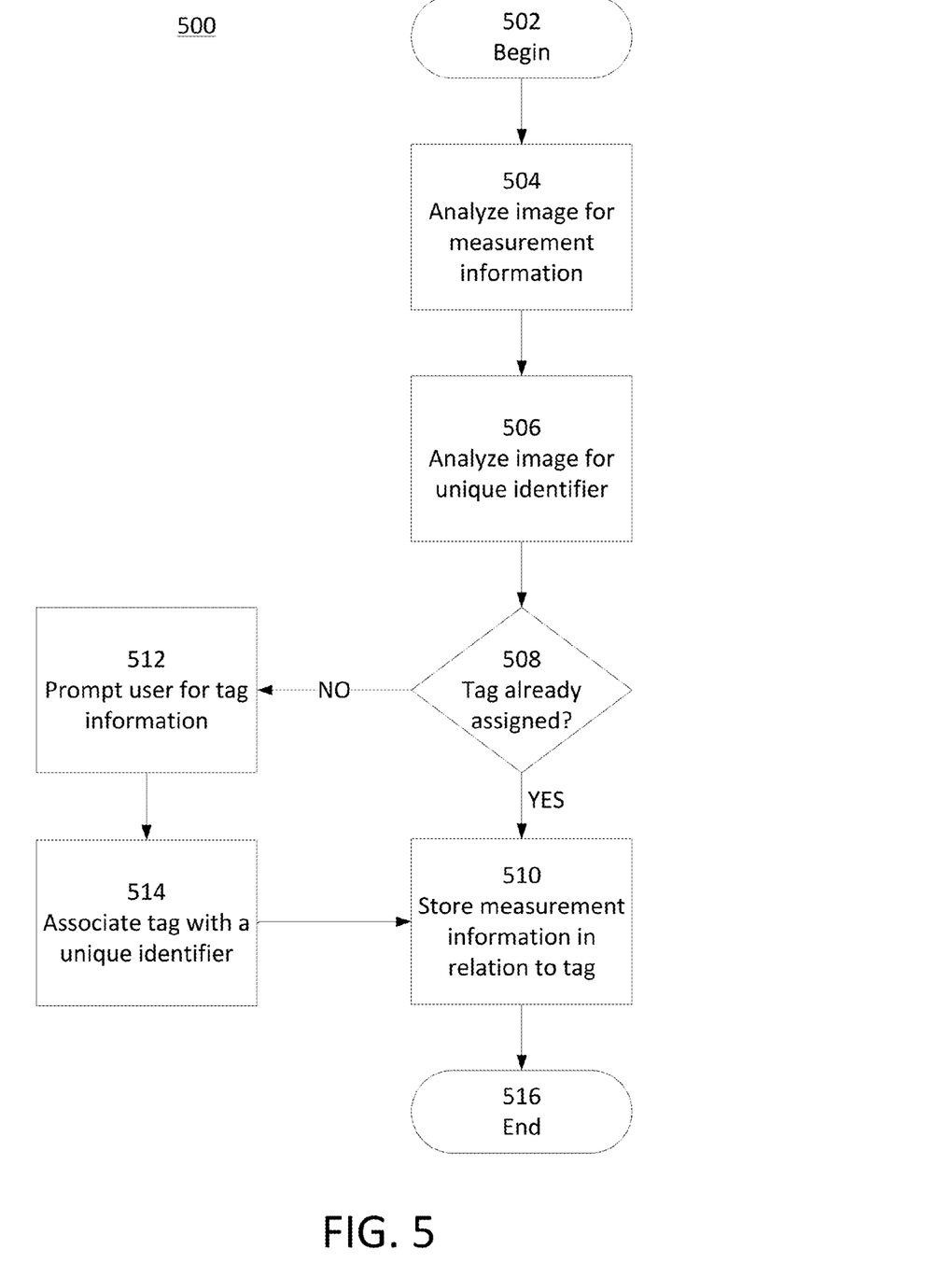
FIG. 5 is a process flow chart used to determine data measurement information from an image.

The controller 106 is operable to automatically identify the type of information (e.g., measurement information or equipment status information) and the medium through which the information is being displayed (e.g., through a fiduciary marker or through an alphanumeric display), and decode the information stored by the controller 106 and/or the memory 104. For example, if the information is displayed as an alphanumeric display, the controller 106 can automatically identify key words (e.g., rated voltage) and values associated therewith (e.g., 120V). As discussed above with reference to the analysis of the first image in step 406 of the process 400 in FIG. 4, however, user input may be required for the controller 106 to complete the analysis of the second image, as discussed in more detail below.

The process 500 continues to step 506, in which the controller 106 analyzes the image for a unique identifier. For example, the measurement information display 204 can include a unique identifier 208 and the equipment status indicator 206 can include a unique identifier 214. If the image includes the measurement information display 204 and the unique identifier 208, for example, then the controller 106 can recognize the latter in the image. Likewise, if the image includes the equipment status indicator 206, then the controller 106 is operable to recognize the unique identifier 214 in the image. At step 508, the controller 106 evaluates whether a tag has already been assigned to the information display (e.g., the measurement information display 204 or the equipment status indicator 206) and the associated unique identifier (e.g., unique identifier 208 or unique identifier 214) captured by the image. If a tag has already been assigned to the unique identifier (508 YES), then the process 500 continues to step 510, in which the captured information is stored in relation to the assigned tag in the memory 104.

If a tag has not already been assigned to the unique identifier (508 NO), then the process 500 continues to step 512, in which the controller 106 prompts the user for tag information. In some examples, the piece of equipment 102 linked to the unique identifier already has a tag associated with the piece of equipment 102 (e.g., assigned at step 406 of process 400), and the user can associate the pre-existing tag with the data display (e.g., the measurement information display 204 or the equipment status indicator 206) coupled to the piece of equipment 102 in the image. At step 514, the controller 106 associates the tag with a unique identifier. The unique identifier (e.g., unique identifier 208 or unique identifier 214) can be recognized by the controller 106 in analyzing subsequent images to automatically categorize the data display associated with the unique identifier as being affiliated with the piece of equipment 102. The process 500 continues to step 510, in which the measurement information is stored in relation to the selected tag. The process ends at step 516.

To illustrate the process 500, in one example the controller 106 receives an image containing the measurement information display 204 and the unique identifier 208. It is assumed that in the present example the controller 106 has already analyzed images containing the measurement information display 204 and the unique identifier 208, and the controller 106 has already stored a tag for the piece of equipment 102 associated with the piece of equipment 102 in the memory 104. Upon receipt of the image, the controller 106 is operable to recognize the unique identifier 208, and automatically associate information extracted from the measurement information display 204 with the piece of equipment 102. The extracted information is stored in the memory 104 in relation to the pre-existing tag associated with the piece of equipment 102.

In the foregoing example, the controller 106 is operable to automatically identify and extract information (e.g., specification information or voltage measurements) from images. However, in other examples, the controller 106 may require input from a user to identify and extract the information. In reference to the first image discussed above, for example, the controller 106 can analyze the first image and initially automatically classify the first image as containing specification information, but require user confirmation to proceed (i.e., the user must confirm that the first image contains specification information). In other examples, the controller 106 may not recognize that a first image includes a specification information display, and may require input from a user to indicate that the first image includes the specification information display.

Responsive to receiving input from a user indicating that the first image includes a specification information display, the controller 106 can automatically identify specification information indicated by the display by evaluating an image with a priori knowledge of the fact that the image contains specification information. The controller 106 may wait for confirmation of the identified parameters by a user (i.e., the controller 106 may request that the user confirm that the controller 106 has properly identified measurement data and values associated with the measurement data) in some examples, while in others the controller 106 may not wait for confirmation by a user.

Furthermore, with reference to the second image(s) discussed above, the controller 106 is operable to automatically identify entities and parameters of interest in some examples, while in others, an initial step of receiving classification information from a user may be required. For example, the controller 106 may request that the user highlight specific areas of interest in the image (e.g., a voltage reading) to provide the controller 106 with a priori information to extract measurement data from the image.

According to some embodiments, some or all of the foregoing methods for extracting information from an image may be impossible due to the image being of poor quality. For example, the image may be blurry, parts of the image may be obscured, the image may not capture the entirety of the entity being photographed, and so forth. In such cases, the controller 106 is operable to automatically identify the errors and will send an indication to a user (e.g., a user operating the image capture device 110) that the image needs to be retaken. In some embodiments, an example of an acceptable image may accompany the notification that the image needs to be retaken.

Figure 6:
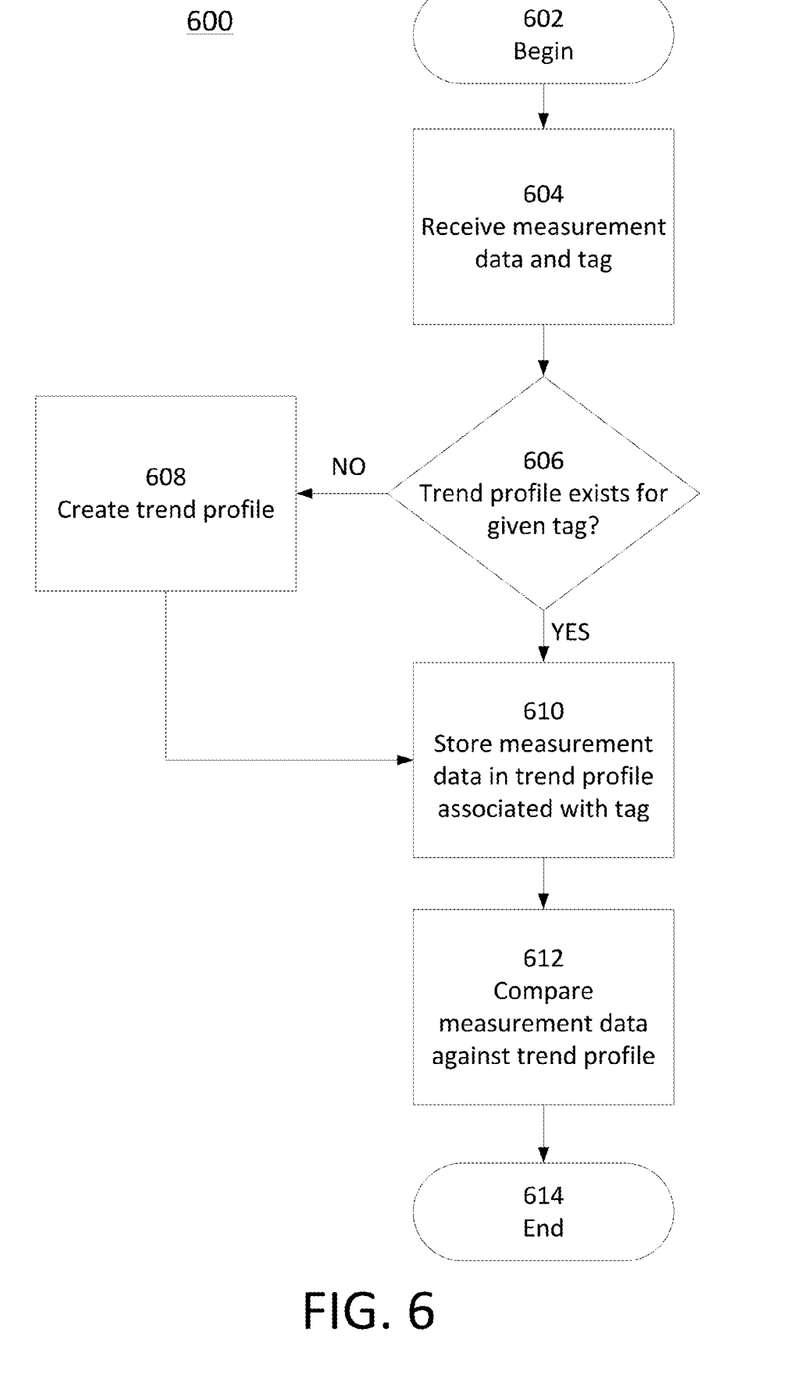
FIG. 6 is a process flow chart used to store measurement data and compare the measurement data against a data trend profile.

FIG. 6 illustrates a process 600 executed by controller 106 to store and compare measurement data with respect to a measurement data trend profile as discussed above with reference to step 312 of process 300 in FIG. 3. At step 602, the process 600 begins. At step 604, the controller 106 receives measurement data and a tag with which the measurement data is associated. At step 606, the controller 106 evaluates whether a trend profile already exists for the tag. If a trend profile does not yet exist (606 NO), the process 600 continues to step 608, in which the controller 106 creates a trend profile.

Once the trend profile has been created (step 608), or if a trend profile already exists for a given tag (606 YES), the process 600 continues to step 610. At step 610, the measurement data received at step 604 is stored in the trend profile associated with the tag. As discussed above, the trend profile can contain one or more measurements taken over a period of time and can indicate general trend information for the measurement parameter. At step 612, the measurement data received at step 604 is compared against the trend profile as a whole (e.g., all of the measurement data stored in the trend profile). As discussed above with reference to step 312, the controller 106 is operable to identify if the measurement data received at step 604 deviates from the trend profile as a whole.

In one embodiment, a user can set a threshold that indicates such a deviation from the trend profile as a whole. The threshold for deviations may be expressed as a number of standard deviations away from the mean of a set of measurement data values within the trend profile. The set may be all of the measurement data values within the trend profile (which grows as more values are collected), or the set may be a collection of measurement values within a baseline time period during which the trend profile represents expected behavior of the equipment being monitored.

Thresholds may optionally be given a time dependency. The equipment being monitored may operate according to a schedule, and different threshold levels may be configured for different blocks of time. As an example, an air handling fan may draw more power during weekdays than weekends, and the threshold levels used during weekdays can be configured to be different than the threshold levels used during weekends.

In the foregoing discussion, FIGS. 3-6 have been directed largely to the receipt and analysis of images containing a single entity to be analyzed (e.g., a specification data display, a measurement information display or an equipment status indicator) for clarity and simplicity of explanation. However, it is to be understood that images containing multiple entities to be analyzed (e.g., a measurement information display and a specification data display in a single image) can undergo a similar process of evaluation, extraction of information, and association with unique tags to group equipment information.

Furthermore, although the foregoing discussion has been directed to extraction of information from images, it is to be understood that a video containing one or more entities to be analyzed (e.g., a measurement information display or a specification data display) can undergo a similar process of evaluation and extraction of information. Moreover, video analysis can provide additional information that cannot be extracted from images. For example, a video can be analyzed by extracting an audio track from the video, and analyzing the audio track for extremely high or low frequency sounds (e.g., sounds too low or too high to perceive by the naked ear) being emitted by a piece of equipment, or by extracting the constituent frequencies present in an audio track to detect abnormal deviations in an otherwise normal-sounding audio track. In further examples, a video can be further analyzed to detect extremely high frequency equipment part revolutions (e.g., revolutions too high to quantify with the naked eye), indicative of an anomalous state of the equipment.

In some examples, analysis of multiple entities in a single image or video requires an initial classification step by a user. For example, the controller 106 may prompt the user to highlight different labels and displays in a single image or video frame and provide appropriate classification (e.g., classifying a first entity as a specification data display and/or classifying a second entity as a measurement information display). Responsive to receiving the appropriate classifications, the controller 106 is operable to extract and analyze equipment information as discussed above with relation to images containing a single entity.

Certain embodiments of the present disclosure include reminders, issued by the controller 106 to a user, prompting the user to take an image of a piece of equipment. For example, the reminders may be sent to users according to a set schedule (e.g., daily, weekly, monthly, erratically). The schedule may be user-defined in some examples, while in others, the controller 106 may dynamically determine an individual schedule for each piece of equipment based on data trends associated with each respective piece of equipment.

The indication sent to the user can further include auxiliary information to assist the user in capturing images of a given piece of equipment. For example, the auxiliary information can include the most recent image taken of the piece of equipment, a floor plan indicating the location of the piece of equipment (determined, for example, by recording a GPS location of the image capture device 110 when an image is acquired), images containing visual cues of the location of the piece of equipment, directions to the piece of equipment, and so forth. While some or all of this auxiliary information can be automatically transmitted to a user according to the set schedule discussed above, the controller 106 is operable to display information including the auxiliary information responsive to selection by a user at any time.

It should be observed that the systems and methods disclosed herein are capable of receiving and analyzing images of equipment to be monitored, and evaluating information drawn from the analysis. The results of the evaluation may be used for, among other things:

1) Creating a trend profile for a piece of equipment;
2) Identifying anomalous measurement data for a piece of equipment that deviates from the trend profile;
3) Identifying measurement data that deviates from specification information for a piece of equipment; and
4) Notifying a user or set of users if a piece of equipment exhibits one or both of the deviations described in 2) and 3).

In one embodiment, the system also includes a database of equipment information grouped by unique tags assigned to individual pieces of equipment. The system can provide suggested energy management routines to follow for each piece of equipment, customized in accordance with the data trend profile associated with each piece of equipment. The system can also provide one or more statistical models (indicating, e.g., electrical power use vs. air flow) derived from the extracted information associated with each piece of equipment.

Various aspects and functions described herein may be included as specialized hardware or software components executing in one or more computer systems. One or more acts of the method described above may be performed with a computer, where at least one act is performed in a software program housed in a computer. Non-limiting examples of computer systems include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 7:
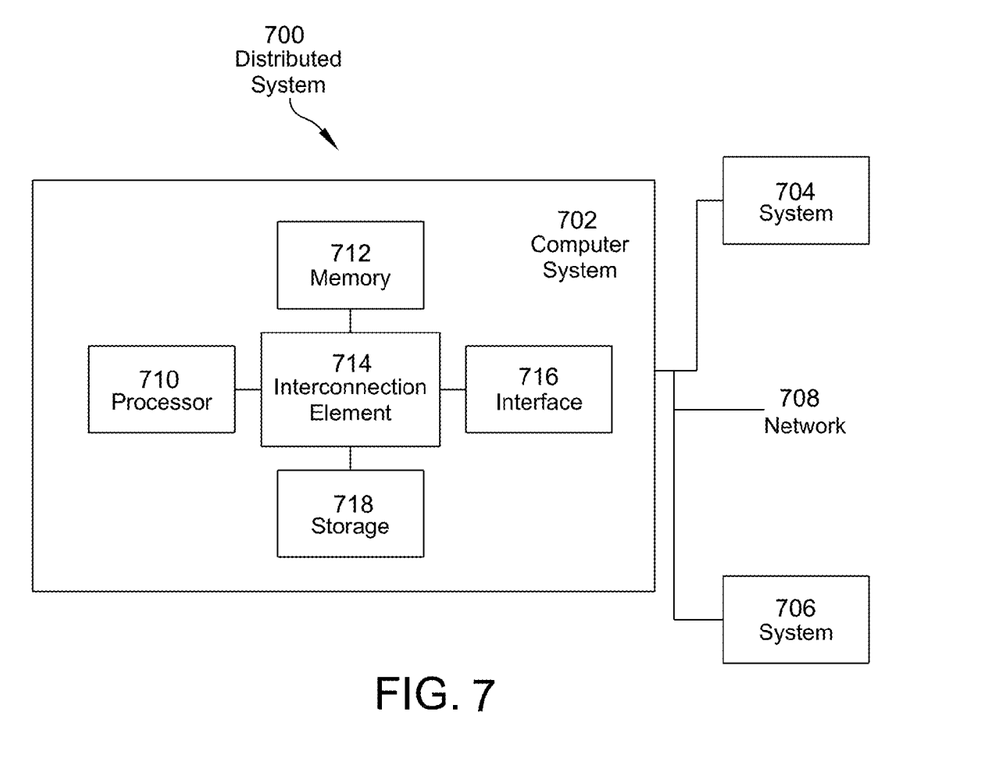
FIG. 7 is a block diagram of one example of a computer system that may be used to perform processes and functions disclosed herein.

Referring to FIG. 7, there is illustrated a block diagram of a distributed computer system 700, in which various aspects and functions are practiced. As shown, the distributed computer system 700 includes one or more computer systems that exchange information. More specifically, the distributed computer system 700 includes computer systems/devices 702, 704 and 706. As shown, the computer systems/devices 702, 704 and 706 are interconnected by, and may exchange data through, a communication network 708. The network 708 may include any communication network through which computer systems may exchange data. To exchange data using the network 708, the computer systems/devices 702, 704 and 706 and the network 708 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 702, 704 and 706 may transmit data via the network 708 using a variety of security measures including, for example, TLS, SSL or VPN. While the distributed computer system 700 illustrates three networked computer systems, the distributed computer system 700 is not so limited and may include any number of computer systems and computing devices, networked using any medium and communication protocol.

As illustrated in FIG. 7, the computer system 702 includes a processor 710, a memory 712, an interconnection element 714, an interface 716 and data storage element 718. To implement at least some of the aspects, functions and processes disclosed herein, the processor 710 performs a series of instructions that result in manipulated data. The processor 710 may be any type of processor, multiprocessor or controller. Some example processors include commercially available processors such as an Intel Atom, Itanium, Core, Celeron, or Pentium processor, an AMD Opteron processor, an Apple A4 or A5 processor, a Sun UltraSPARC or IBM Power5+ processor and an IBM mainframe chip. The processor 710 is connected to other system components, including one or more memory devices 712, by the interconnection element 714.

The memory 712 stores programs and data during operation of the computer system 702. Thus, the memory 712 may be a relatively high performance, volatile, random access memory such as a dynamic random access memory ("DRAM") or static memory ("SRAM"). However, the memory 712 may include any device for storing data, such as a disk drive or other nonvolatile storage device. Various examples may organize the memory 712 into particularized and, in some cases, unique structures to perform the functions disclosed herein. These data structures may be sized and organized to store values for particular data and types of data.

Components of the computer system 702 are coupled by an interconnection element such as the interconnection element 714. The interconnection element 714 may include one or more physical busses, for example, busses between components that are integrated within a same machine, but may include any communication coupling between system elements including specialized or standard computing bus technologies such as IDE, SCSI, PCI and InfiniBand. The interconnection element 714 enables communications, such as data and instructions, to be exchanged between system components of the computer system 702.

The computer system 702 also includes one or more interface devices 716 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 702 to exchange information and to communicate with external entities, such as users and other systems.

The data storage element 718 includes a computer readable and writeable nonvolatile, or non-transitory, data storage medium in which instructions are stored that define a program or other object that is executed by the processor 710. The data storage element 718 also may include information that is recorded, on or in, the medium, and that is processed by the processor 710 during execution of the program. More specifically, the information may be stored in one or more data structures specifically configured to conserve storage space or increase data exchange performance. The instructions may be persistently stored as encoded signals, and the instructions may cause the processor 710 to perform any of the functions described herein. The medium may, for example, be optical disk, magnetic disk or flash memory, among others. In operation, the processor 710 or some other controller causes data to be read from the nonvolatile recording medium into another memory, such as the memory 712, that allows for faster access to the information by the processor 710 than does the storage medium included in the data storage element 718. The memory may be located in the data storage element 718 or in the memory 712, however, the processor 710 manipulates the data within the memory, and then copies the data to the storage medium associated with the data storage element 718 after processing is completed. A variety of components may manage data movement between the storage medium and other memory elements and examples are not limited to particular data management components. Further, examples are not limited to a particular memory system or data storage system.

Although the computer system 702 is shown by way of example as one type of computer system upon which various aspects and functions may be practiced, aspects and functions are not limited to being implemented on the computer system 702. Various aspects and functions may be practiced on one or more computers having a different architectures or components than that shown in FIG. 7. For instance, the computer system 702 may include specially programmed, special-purpose hardware, such as an application-specific integrated circuit ("ASIC") tailored to perform a particular operation disclosed herein. While another example may perform the same function using a grid of several general-purpose computing devices running MAC OS X with IBM PowerPC processors and several specialized computing devices running proprietary hardware and operating systems.

The computer system 702 may be a computer system including an operating system that manages at least a portion of the hardware elements included in the computer system 702. In some examples, a processor or controller, such as the processor 710, executes an operating system. Examples of a particular operating system that may be executed include a Windows-based operating system, such as the Windows 8 operating system, available from the Microsoft Corporation, a MAC OS X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 710 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++ or Python. Thus, the examples are not limited to a specific programming language and any suitable programming language could be used. Accordingly, the functional components disclosed herein may include a wide variety of elements, e.g. specialized hardware, executable code, data structures or objects, which are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Those skilled in the art will readily appreciate that the various parameters and configurations described herein are meant to be exemplary and that actual parameters and configurations will depend upon the specific application for which the embodiments directed toward the equipment monitoring methods and system of the present disclosure are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, the disclosed equipment monitoring methods and systems may be practiced otherwise than as specifically described. The present systems and methods are directed to each individual feature or method described herein. In addition, any combination of two or more such features, apparatus or methods, if such features, apparatus or methods are not mutually inconsistent, is included within the scope of the present disclosure. Further, it is to be appreciated various alterations, modifications, and improvements will readily occur to those skilled in the art. Such alterations, modifications, and improvements are intended to be part of this disclosure, and are intended to be within the spirit and scope of the disclosure. For example, an existing process may be modified to utilize or incorporate any one or more aspects of the disclosure. Thus, in some embodiments, embodiment may involve connecting or configuring an existing process to comprise the equipment monitoring methods and systems. Accordingly, the foregoing description and drawings are by way of example only. Further, the depictions in the drawings do not limit the disclosures to the particularly illustrated representations. While exemplary embodiments have been disclosed, many modifications, additions, and deletions may be made therein without departing from the spirit and scope of the disclosure and its equivalents, as set forth in the following claims.

What is claimed is:

1. A method of monitoring equipment data of a piece of equipment, the method comprising:
    extracting data specifications from a first image, the first image including data specification information for the piece of equipment;
    storing the data specifications;
    extracting measurement data from at least one second image, the at least one second image including measurement information for the piece of equipment;
    associating the measurement data with the piece of equipment;
    storing the measurement data;
    generating a measurement data trend profile for the piece of equipment;
    comparing operational measurement data against the measurement data trend profile; and
    notifying one or more users when the operational measurement data associated with the piece of equipment deviates from at least one of the measurement data trend profile and the stored data specifications,
        wherein the at least one second image is of a fiduciary marker, and
        wherein all of the foregoing acts are performed by a controller.

2. The method of claim 1, further comprising assigning a tag to the piece of equipment.

3. The method of claim 2, wherein the tag is assigned to the measurement data.

4. The method of claim 2, further comprising automatically associating the operational measurement data with the tag.

5. The method of claim 1, wherein the first image is an image of a nameplate.

6. The method of claim 1, wherein the at least one second image is of an alphanumeric measurement display.

7. The method of claim 1, wherein the measurement data trend profile includes one or more sets of operational measurement data.

8. The method of claim 7, wherein the one or more sets of operational measurement data are extracted from one or more images including measurement information for the piece of equipment.

9. The method of claim 1, further comprising notifying the one or more users when the operational measurement data associated with the piece of equipment deviates from the data specifications.

10. A system for monitoring equipment data of a piece of equipment, the system comprising:
    a piece of equipment;
    a specification data display affixed to the piece of equipment;
    a measurement data display coupled to the piece of equipment; and
    a controller coupled to a memory, the controller being configured to
        receive a first image, the first image including the specification data display,
        extract data specifications from the first image,
        store the data specifications in the memory, receive at least one second image, the at least one second image including the measurement data display, extract measurement data from the at least one second image, associate the measurement data with the piece of equipment, store the measurement data in the memory, generate a measurement data trend profile for the piece of equipment, compare operational measurement data against the measurement data trend profile, notify one or more users when the operational measurement data associated with the piece of equipment deviates from the measurement data trend profile, and notify the one or more users when the operational measurement data associated with the piece of equipment deviates from the data specifications.

11. The system of claim 10, wherein the controller is further configured to assign a tag to the piece of equipment.

12. The system of claim 11, wherein the controller is further configured to assign the tag to the measurement data.

13. The system of claim 11, wherein the controller is further configured to automatically associate the operational measurement data with the tag.

14. The system of claim 10, wherein the at least one second image includes a unique identifier.

15. The system of claim 10, wherein the measurement data display includes alphanumeric measurement information.

16. The system of claim 10, wherein the measurement data display includes a fiduciary marker.

17. The system of claim 10, wherein the measurement data trend profile includes one or more sets of operational measurement data.

18. The system of claim 17, wherein the one or more sets of operational measurement data are extracted from one or more images including measurement information for the piece of equipment.

* * * * *